US010674574B1

(12) United States Patent
Herbst et al.

(10) Patent No.: US 10,674,574 B1
(45) Date of Patent: Jun. 2, 2020

(54) LIGHTING CONTROL SYSTEM AND DEVICES

(71) Applicant: REVOLUTION LIGHTING TECHNOLOGIES, INC., Stamford, CT (US)

(72) Inventors: Joseph E. Herbst, Newberg, OR (US); Nicholas G. Preiser, Portland, OR (US); Ward Ramsdell, Hillsboro, OR (US); Marc Christiansen, Portland, OR (US)

(73) Assignee: Revolution Lighting Technologies, Inc., Stamford, CT (US)

( * ) Notice: Subject to any disclaimer, the term of this patent is extended or adjusted under 35 U.S.C. 154(b) by 0 days.

(21) Appl. No.: 16/261,956

(22) Filed: Jan. 30, 2019

(51) Int. Cl.
*H05B 37/02* (2006.01)
*H02J 50/00* (2016.01)

(52) U.S. Cl.
CPC ..... *H05B 37/0272* (2013.01); *H05B 37/0263* (2013.01); *H05B 37/0281* (2013.01); *H02J 50/00* (2016.02)

(58) Field of Classification Search
CPC ....................................................... H02J 50/00
USPC .................................................. 315/153, 361
See application file for complete search history.

(56) References Cited

U.S. PATENT DOCUMENTS 4,060,735 A * 11/1977 Pascucci ............. H02J 13/0089 307/3
9,609,720 B2 * 3/2017 Woytowitz
2011/0279057 A1 * 11/2011 Briggs ............... H05B 37/0245 315/294

* cited by examiner

*Primary Examiner* — Thuy V Tran
(74) *Attorney, Agent, or Firm* — Barlow, Josephs & Holmes, Ltd.

(57) ABSTRACT

A lighting control system includes a control system, a plurality of connected control devices and a plurality of lighting output devices each of which includes a processor at their installed location. The control devices and lighting output devices are in communication with the processors via the conventional two-wire power supply wiring. The connected lighting devices are configured to receive a control signal from the control devices through the control system and selectively operate based on the control signal received. The control system may further support multiple control systems that may be interconnected together via conventional two-wire power delivery systems to control larger arrays of sensors, control inputs, and lighting output devices.

14 Claims, 21 Drawing Sheets

280

LIGHTING CONTROL SYSTEM AND DEVICES

BACKGROUND OF THE INVENTION

1. Field of the Invention

The present disclosure relates generally to lighting fixtures and devices and more particularly to a lighting control system and devices that allows centralized, but highly customizable and expandable lighting control system using only the two conductors typically supplied for powering the devices.

2. Background of the Related Art

Lighting control systems are useful to conserve power and provide a centralized user experience in commercial and residential buildings. However, prior art lighting control systems are expensive and require complex added wiring for deployment while retaining the benefit of being customizable and expandable.

SUMMARY OF THE INVENTION

The lighting control system disclosed herein solves the problems of the prior art by providing a control system, a plurality of connected control devices and a plurality of connected lighting output devices, wherein each connected device includes a processor. The plurality of control devices and lighting output devices are in communication with each of the processors via the power supply wiring. The connected devices are configured to receive a control signal from the control devices and selectively operate based on the control signal received. The control system may further support multiple control systems that may be interconnected together via conventional two wire power delivery systems to control larger arrays of sensor, control inputs, such as switches, and lighting devices.

Furthermore, the modular aspect of the control system permits different combinations of diverse types of lighting, including both low and high voltage lighting devices. The control system further may include a self-hosted web page of configuration settings, permitting logical grouping and scheduling of devices connected to the system, including assigning control inputs, such as sensor inputs and switch inputs, to devices and/or groups of devices connected to the system. The control system may further be configured with wireless and/or wired communication adapters to support a wide variety of devices connected to the system, including legacy and newer device communication protocols.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENTS

The following detailed description of exemplary implementations refers to the accompanying drawings. The same reference numbers in different drawings may identify the same or similar elements.

As will be described in greater detail below, a lighting control system includes an integrated digital control system 102 having a processor, a communication interface and a two wire control output connected to the processor, where the two wire control output carries a power feed and a modulated control signal to selectively operate a plurality of lighting devices that each contain a dedicated addressable control receiver that causes each of the lighting devices to operate based on the control input received from the processor.

Figure 1:
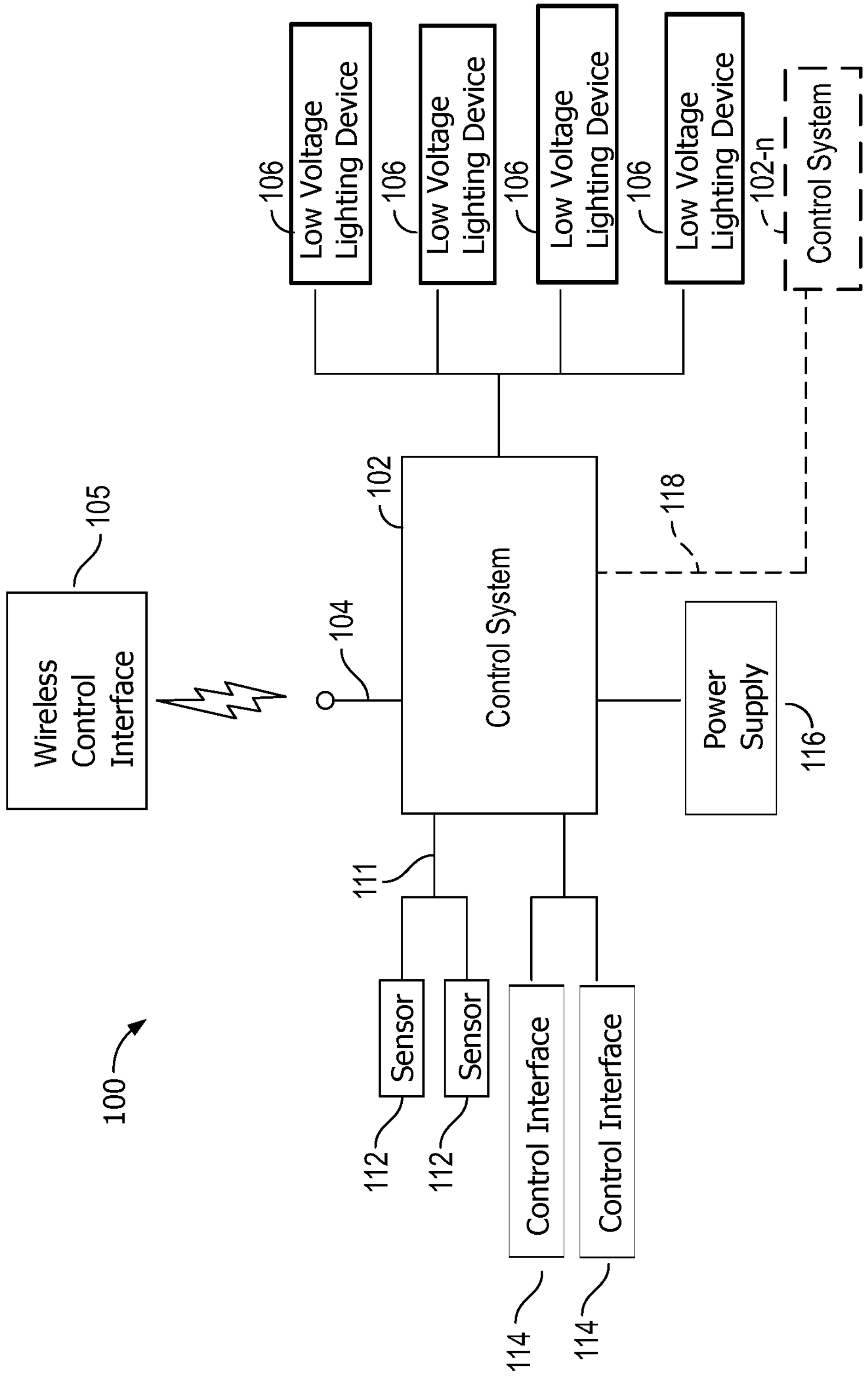
FIG. 1 is a diagram of an overview of the lighting control system and devices described herein.

FIG. 1 is a diagram of an overview of a lighting control system 100 as described herein. The system 100 generally includes at least one integrated digital control system 102 that itself has one or more output channels that are interconnected to various arrangements of lighting devices 106 which may be high voltage lighting device or low voltage lighting devices. Interaction with control system 102 may be through a wireless control interface 105, such as a smartphone, analog wire interface 111, and/or digital wire control interface 114 and other wireless inputs, such as EnOcean-enabled wall switches and sensors, for example (EnOcean is a trademark of EnOcean, GmbH). Where multiple control systems 102 are used, they may be interconnected via a wired or wireless communication mechanism 118, such as communication interface 270 described further below, in order to expand the system to control more lighting and devices. In an example embodiment, control system 102 generates pulse width modulated ("PWM") and/or variable pulse width modulated ("VPWM") control signals to control low voltage lighting devices 106. The number of devices may be further expanded by adding additional control system units 102-N to allow for additional connections of lighting control inputs and outputs, control stations and/or sensors. Further, input power supply 116 is provided to supply low voltage power to operate the control system 102 as well as for delivery to controlled low voltage lighting devices 106.

Embodiments of the control system 102 may include a wireless communication interface 270 which may include IEEE 802.11, Bluetooth, and/or other RF communications methods, such as ZigBee (IEEE 802.15.4), EnOcean, Z-Wave, Bluetooth and the like (Z-Wave is a registered trademark of Silicon Laboratories, Inc.) (Bluetooth is a registered trademark of the Bluetooth Special Interest Group) (ZigBee is a registered trademark of ZigBee Alliance, Inc.). A user may initiate commands to the control system 102 with a mobile device 105, such as a smartphone, tablet computer, a wall control station 280, laptop or desktop computing device, and the like, via an ethernet connection on the digital wire control interface 114, via USB connection or the analog wire interface 111 and described further below.

Sensors 112 connected to the analog wire interface 111 may include 0-10V daylight sensors, both active and passive, UNV sensors and other legacy, power over ethernet (POE) sensors. Such sensors 112, may include temperature sensors, daylight sensors, passive infrared ("PIR"), occupancy sensors, vacancy sensors, ultrasonic, vibration, humidity, and the like. Sensors 112 may be configured as high voltage or low voltage devices. Sensors 112 may be connected to the control system 102 in wired and/or wireless configurations. Sensors 112 may be connected to a power source or have an internal power source, such as a battery or solar cell.

Figure 2:
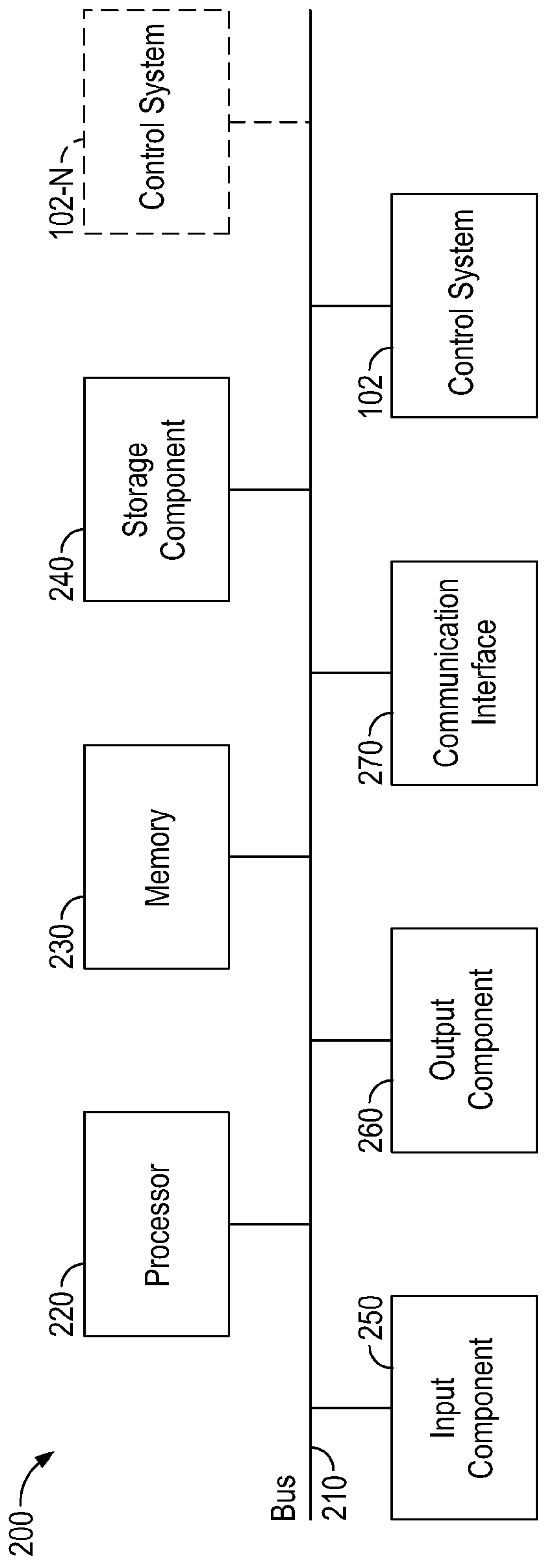
FIG. 2 is a diagram of an example components of a device which may be configured as, for example a control system, among others, for the lighting control system and devices described herein.

FIG. 2 is a diagram of example components of a device 200 that may be interconnected with one or more control systems 102 through 102-N via digital interface 114 or analog interface 111. In some implementations the device may include a bus 210, a processor 220, a memory 230, a storage component 240, an input component 250, an output component 260, and a communication interface 270.

Bus 210 may include a component that permits communication among the components of device. Processor 220 is implemented in hardware, firmware, or a combination of hardware and software. Processor 220 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 230 may include a random access memory (RAM), a read only memory (ROM), and/or another type of dynamic or static storage device (e.g., a flash memory, a magnetic memory, an optical memory, etc.) that stores information and/or instructions for use by processor 220.

Storage component 240 may store information and/or software related to the operation and use of device. For example, storage component 240 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 250 may include a component that permits device to receive information, such as via user input (e.g., a touch screen display, a keyboard, a keypad, a mouse, a button, a switch, a microphone, etc.). Additionally, or alternatively, input component 250 may include a sensor for sensing information (e.g., a global positioning system (GPS) component, occupancy sensor, an accelerometer, a gyroscope, an actuator, etc.). Output component 260 may include a component that provides output information from device 200 (e.g., a display, a speaker, one or more light-emitting diodes (LEDs), etc.).

Communication interface 270 may include a transceiver-like component (e.g., a transceiver, a separate receiver and transmitter, etc.) that enables devices to communicate with other devices, such as via a wired connection, a wireless connection, or a combination of wired and wireless connections. Communication interface 270 may permit device 200 to receive information from another device and/or provide information to another device. For example, communication interface 270 may include an Ethernet interface, including IEEE 802.3 power over ethernet, an optical interface, a coaxial interface, an infrared interface, a radio frequency (RF) interface, a universal serial bus (USB) interface, a Wi-Fi interface, an IEEE 802.15.4 compliant interface, a Bluetooth interface, a cellular network interface, or the like.

Device 200 may perform one or more processes described herein. Device 200 may perform these processes in response to processor 220 executing software instructions stored by a computer-readable medium, such as memory 230 and/or storage component 240. A computer-readable medium is defined herein as a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
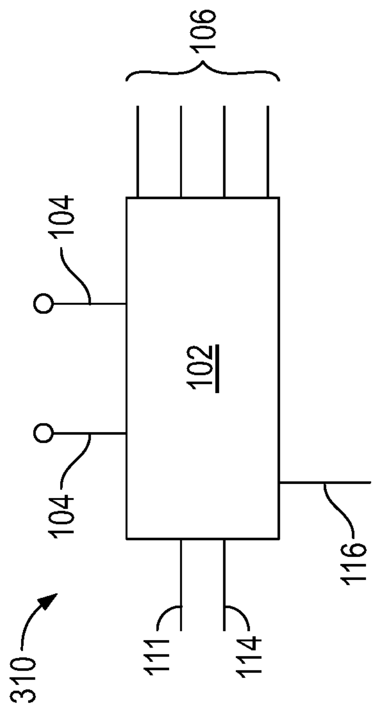
FIG. 3 is a diagram of an example for a lighting control system and devices described herein having high voltage and low voltage lighting control outputs and wireless connectivity.

An exemplary configuration of a control system 102 is illustrated in FIG. 3. As examples, the exemplary control systems 102 are shown with four low voltage lighting devices 106. However, different implementations may include any number of low voltage lighting control outputs. Furthermore, various combinations of total inputs and outputs may also be configured. In one embodiment, the control system 102 supports twenty total inputs and outputs, with four wired and twelve wireless. Limiting the total number of inputs may reduce cost of the control system 102, but provide sufficient flexibility for installation and configuration of many residential and commercial buildings.

An example embodiment of a control system 102 is generally illustrated at 310. The control system 102 generally includes four output channels for both supplying power and controlling low voltage lighting devices 106, two USB inputs 111 switch inputs for low voltage switches and dimmers 112, communication interface via ethernet 114 that includes an ethernet connector for POE sensors 112 and bus 210 connectivity and wireless adapters 104 for connecting via Wi-Fi and/or Bluetooth to other wireless sensors 112 and wireless control devices 105. Wireless adapter 104 may further support EnOcean protocol and ZigBee protocol.

Figure 4A:
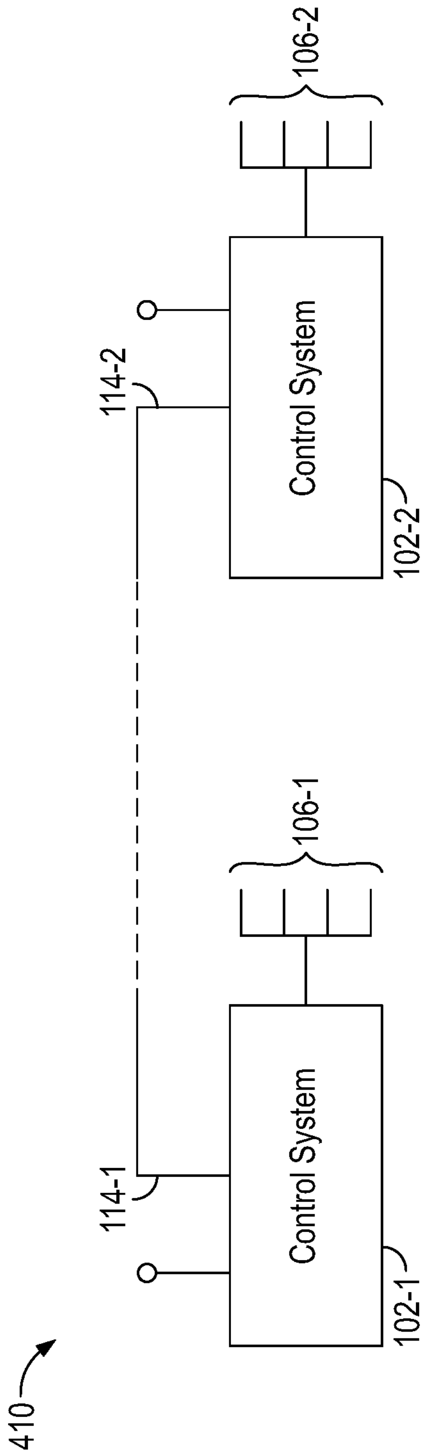
FIG. 4A is a diagram of an example lighting control system illustrating multiple control systems connected together with a wired communication interface.

In FIG. 4A an example embodiment is shown generally at 410 where the lighting control system may include multiple control systems 102-1, 102-2 connected together through the communication interface 270, such as by ethernet 114-1 and 114-2, in order to expand the number and configuration of lighting devices 106, sensors and inputs that may be controlled by the system. For example, a control system 102-1 may have four channels of low voltage lighting devices 106-1, where a subsequent control system 102-2 controls additional low voltage lighting devices 106-2. Alternatively, this connection of control systems 102-1 and 102-2 may be made through an expansion bus 210, as noted above.

In some embodiments where the lighting control system where more than one control system 102 is used, one control system 102-1 may identify itself as an initiator device and other connected control systems 102-2, **102-*n* operate as target device. In other embodiments, where the lighting control system of more than one control system 102 is used, there is no centralized Initiator control, but control of lighting devices 106 is distributed through the system, control system by control system. In other embodiments, the multiple control systems 102-1, 102-2—are configured to operate independently. Regardless of the configuration, the operation of the lighting devices 106 is transparent to users of the system. As noted above, the multiple control systems 102 may be interconnected by one or more expansion busses 210**.

Figure 4B:
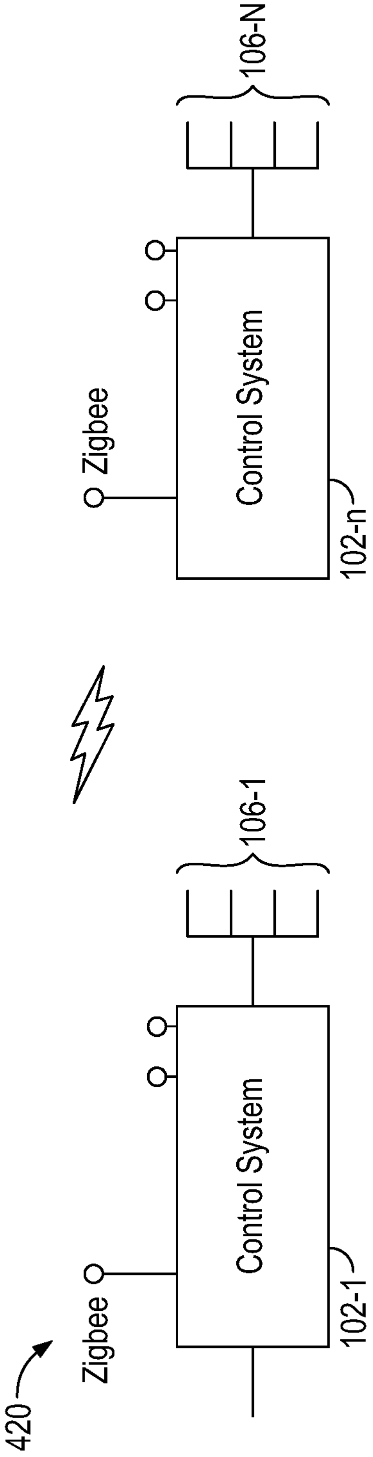
FIG. 4B is a diagram of an example lighting control system illustrating multiple control systems connected together with a wireless communication interface.

In FIG. 4B an example embodiment is shown generally at 420 where the lighting control system may include multiple control systems 102-1, **102-*n*** connected together wirelessly through the communication interface, such as through the ZigBee protocol.

Figure 4C:
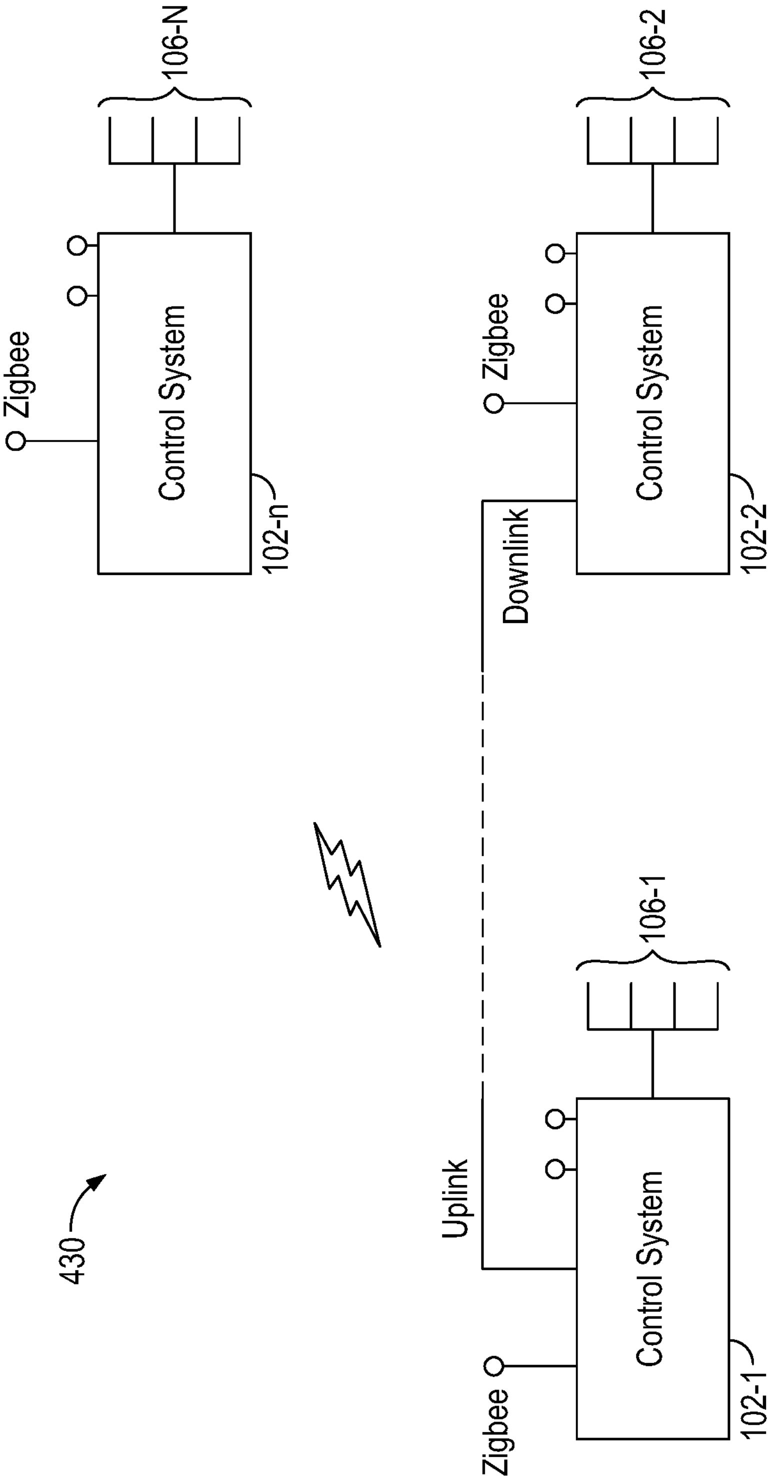
FIG. 4C is a diagram of an example lighting control system illustrating multiple control systems connected together with wired and wireless communication interfaces.

In FIG. 4C an example embodiment is shown generally at 430 where the lighting control system may include multiple control systems 102-1, 102-2, **102-*n* connected together, both wired and wirelessly, through the communication interface 270. As shown, a first control system 102-1 is connected via wire to a second control system 102-2. Alternatively, the connection between control system 102-1 and 102-2 may be made through an expansion bus 210, as noted above. A third control system 102-*n* is connected to the first and second control systems 102-1, 102-2** wirelessly, through a protocol such as ZigBee. As noted above, other wireless protocols may be used as desired.

Figure 4D:
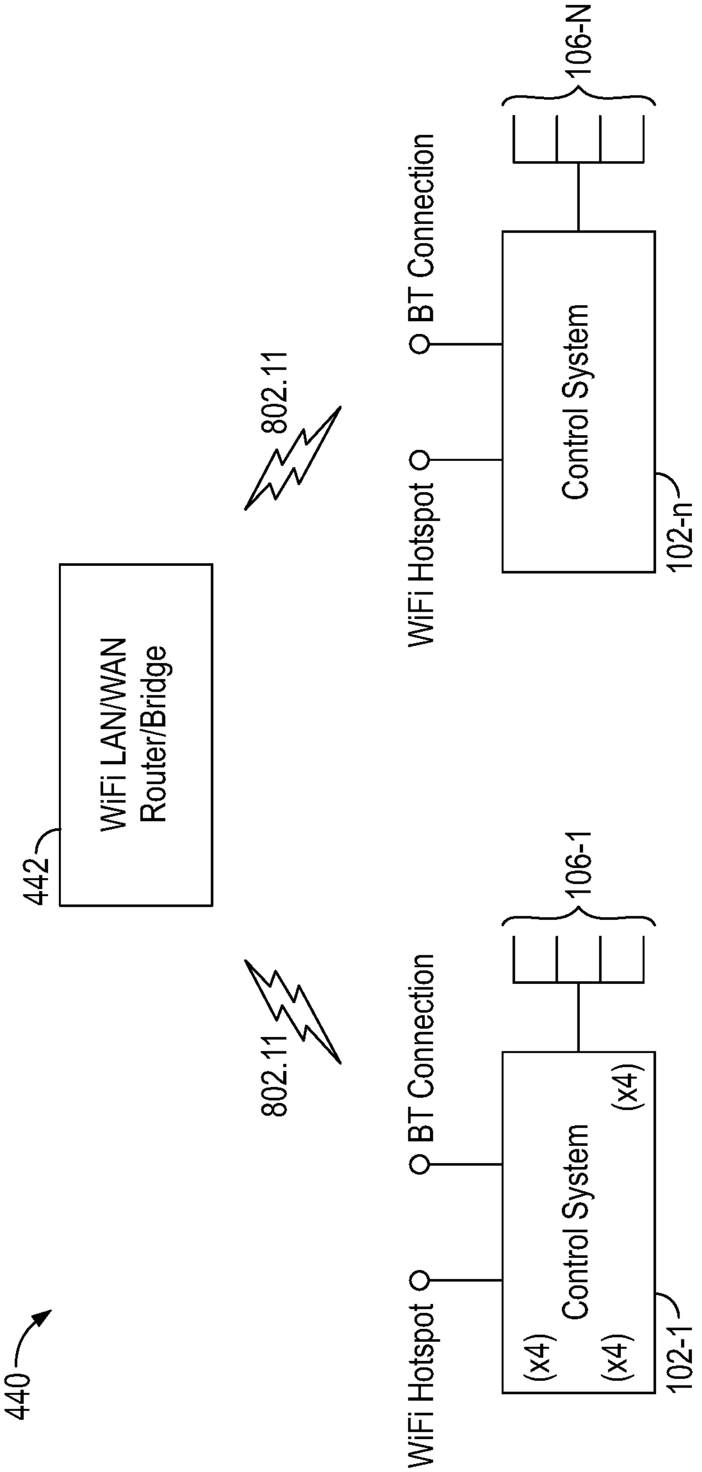
FIG. 4D is a diagram of an example lighting control system illustrating multiple control systems indirectly connected together with a wireless communication interface through a router/bridge device and/or directly connected together with a Bluetooth wireless communication interface.

In FIG. 4D an example embodiment is shown at 440 where multiple control systems 102-1, **102-*n* may be connected together indirectly via a device 442 such as a bridge or router, permitting lighting devices to be centrally controlled on lighting systems where the control systems 102-1, 102-*n* are not located within direct wired or wireless communication distance to one another. The effective use of a router or bridge type device 442 thus permits disparate lighting devices 106**, to be controlled in a cost effective and efficient manner, allowing large buildings and/or multiple buildings lighting to be centrally and remotely operated.

Figure 4E:
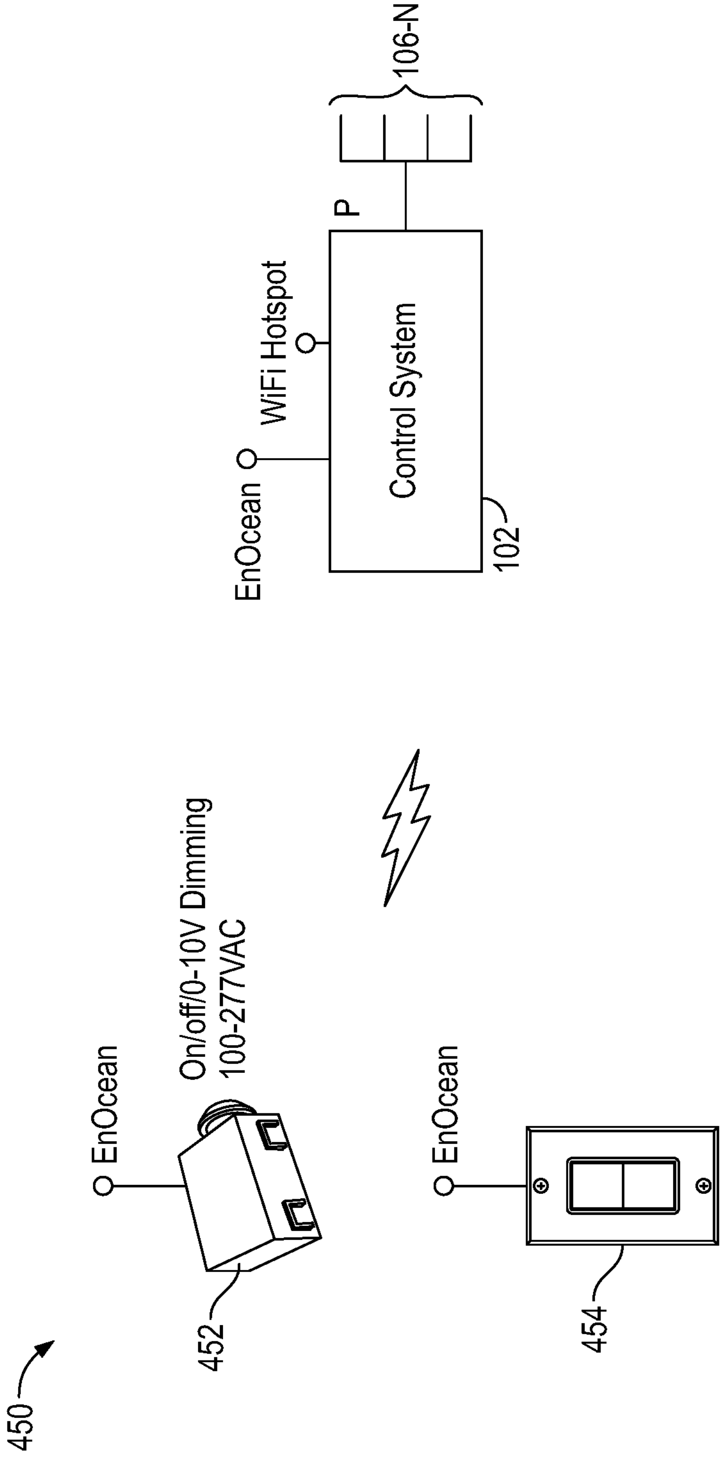
FIG. 4E is a diagram of an example lighting control system illustrating a control system wirelessly connected to switch inputs via the EnOcean protocol.

In FIG. 4E an example environment is shown at 450 illustrating a control system 102 that includes a communication interface 270 having a wireless adapter implementing EnOcean protocol that is configured to communicate with other EnOcean enabled devices, such as wall switches and dimmers, both low voltage and high voltage, to control lighting devices 106.

FIGS. 5A-5I illustrate webpages that may be served by an exemplary control system 102. The control system 102 may include instructions stored in the storage component 204, that when executed, cause the processor 220 to transmit a web page through communication interface 270 to the control station 280 or user device 105. As an example, Linux operating system software may be adapted for use on the control system 102. Further, the control system may have software, such as Apache HTTP server, NGINX, Apache Tomcat, Node.js web server, or the like, to receive and respond to requests through communication interface 270. Lighting components 106, and other devices connected to the control system 102, are rendered as objects that the user may manipulate seamlessly to operate, group and otherwise abstract away the hardware from the user. These "objects" are locally parsed and stored on the storage component 204 of the control system 102, thereby obviating the need for a centralized server or other infrastructure.

In addition to groups, lighting devices 106 and elements of the system 100 may be organized into scenes, which may comprise, groups, individual lighting elements and particular settings applicable for all the elements included in the scene. Groups and scenes are software constructs that are held consistent across a network of devices. Each element of the system can invoke a scene or set levels to a group and if that scene or group is a global construct that information can be shared across the network in a broadcast/multicast manner that does not require acknowledgement of receipt from target recipients thus reducing latency of effect from stimulus events and consistency of response amongst the target recipients. An example of this is use of a UDP or multicast, broadcast message type across a backbone of communication networks that is agnostic to destination IP address or MAC address.

Figure 5A:
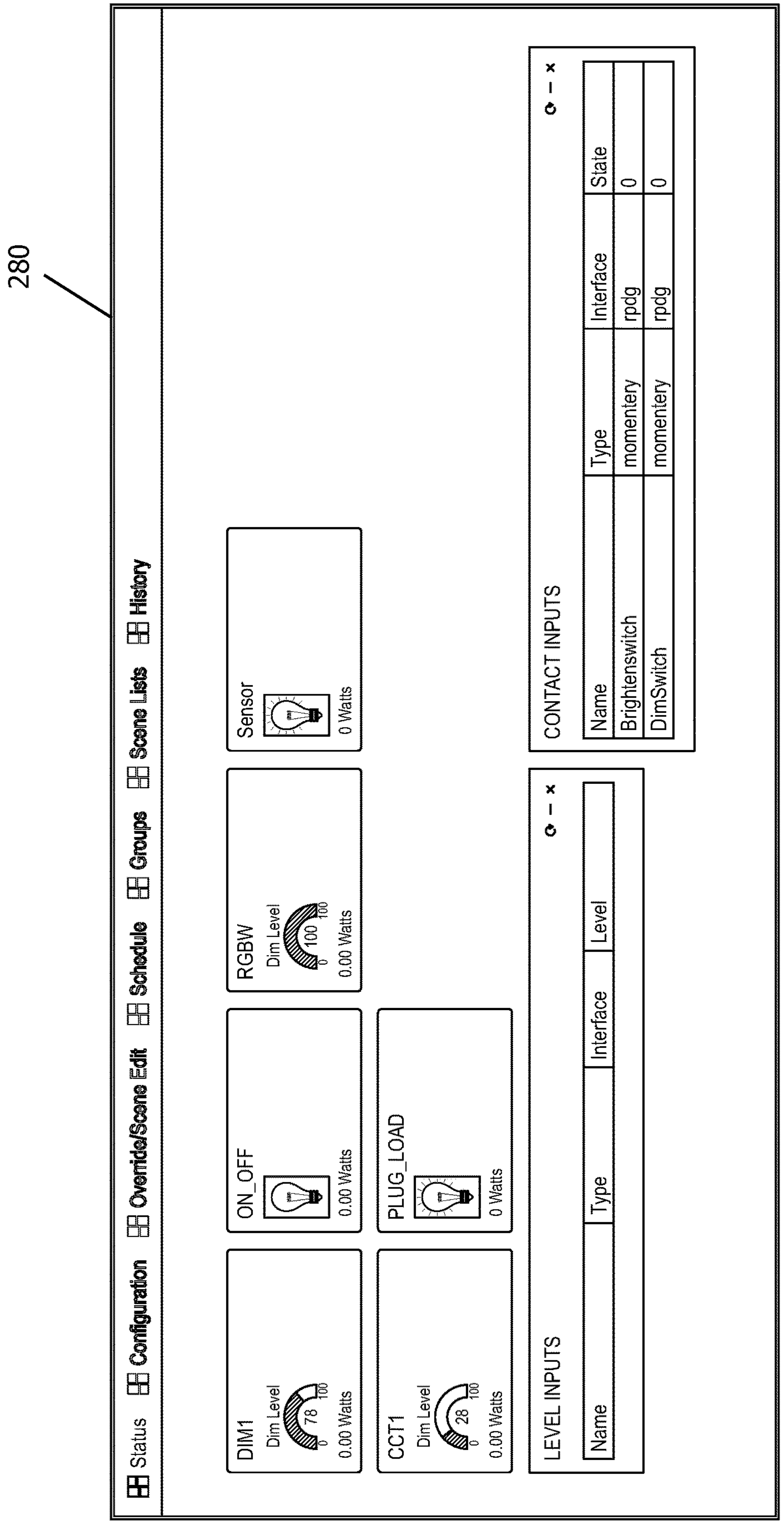
FIG. 5A is an example hosted web page for viewing the status of devices connected to the lighting control system.

FIG. 5A shows a diagram of a web page of status information for sensor 112 and lighting devices 106 connected to the control system 102. For instance, dimming level and on/off information is displayed for each lighting device. Additional power consumption for each lighting device 106 may be displayed.

Status information displayed for each sensor 112 may be segregated by type, including the status of occupancy and vacancy sensors; temperature, humidity detected by those types of sensor, and daylight level detected by daylight sensors, and the like. Furthermore, the status of switches connected to the system may also be determined, such as whether dry contacts are engaged and/or low voltage inputs are engaged and the voltage level.

Status information for the communication interface 270 may also be displayed for devices connected wirelessly, if enabled, to the control system 102, such as devices connected via Bluetooth, WiFi and/or ZigBee, by way of example.

Figure 5B:
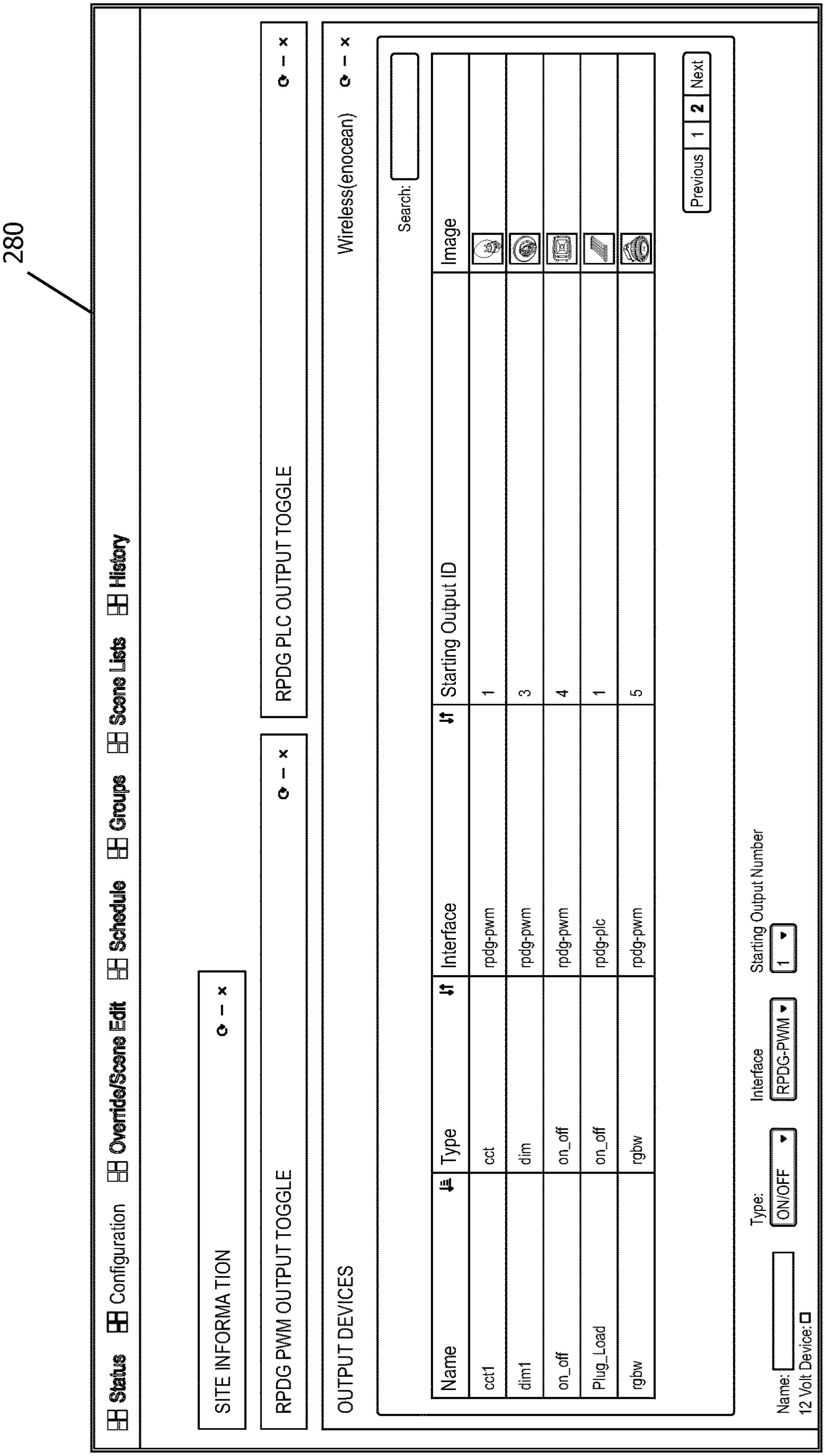
FIG. 5B is an example hosted web page for controlling lighting control outputs and other configuration information for specific lighting fixtures through the control system.

FIG. 5B illustrates an example web page that may be displayed by the control systems 102 showing configuration information for the devices connected to the system 100. Configuration information may include the name, type, interface and device identification number and an optional image of the device connected to the system, for instance. Further, devices to be added and deleted to the lighting system. For each device, inputs and outputs may be assigned to the device, including whether the device is sensor controlled or switch controlled, dimmable and/or the output control the device is connected to the control system 102. Optional configuration information may be set per device, by type, including diming options, occupancy and vacancy settings, temperature floor and ceiling event settings, daylight floor and ceiling event settings.

Figure 5C:
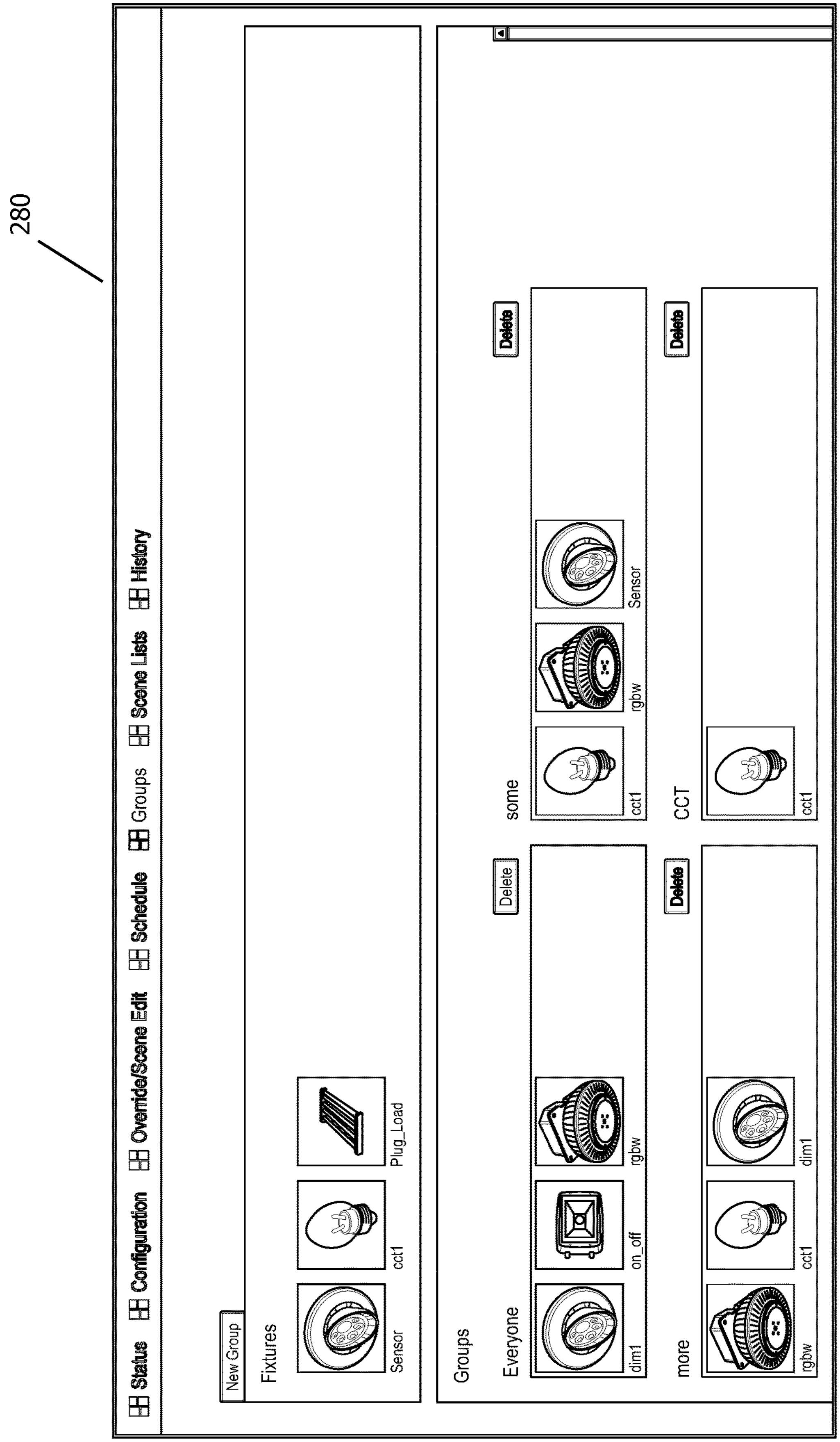
FIG. 5C is an example hosted web page for viewing and controlling lighting logical groups through the control system.

FIG. 5C shows a diagram of a web page for creating a new group of lighting devices 106 through drag and drop of existing lighting devices 106 connected to the control system 102.

Figure 5D:
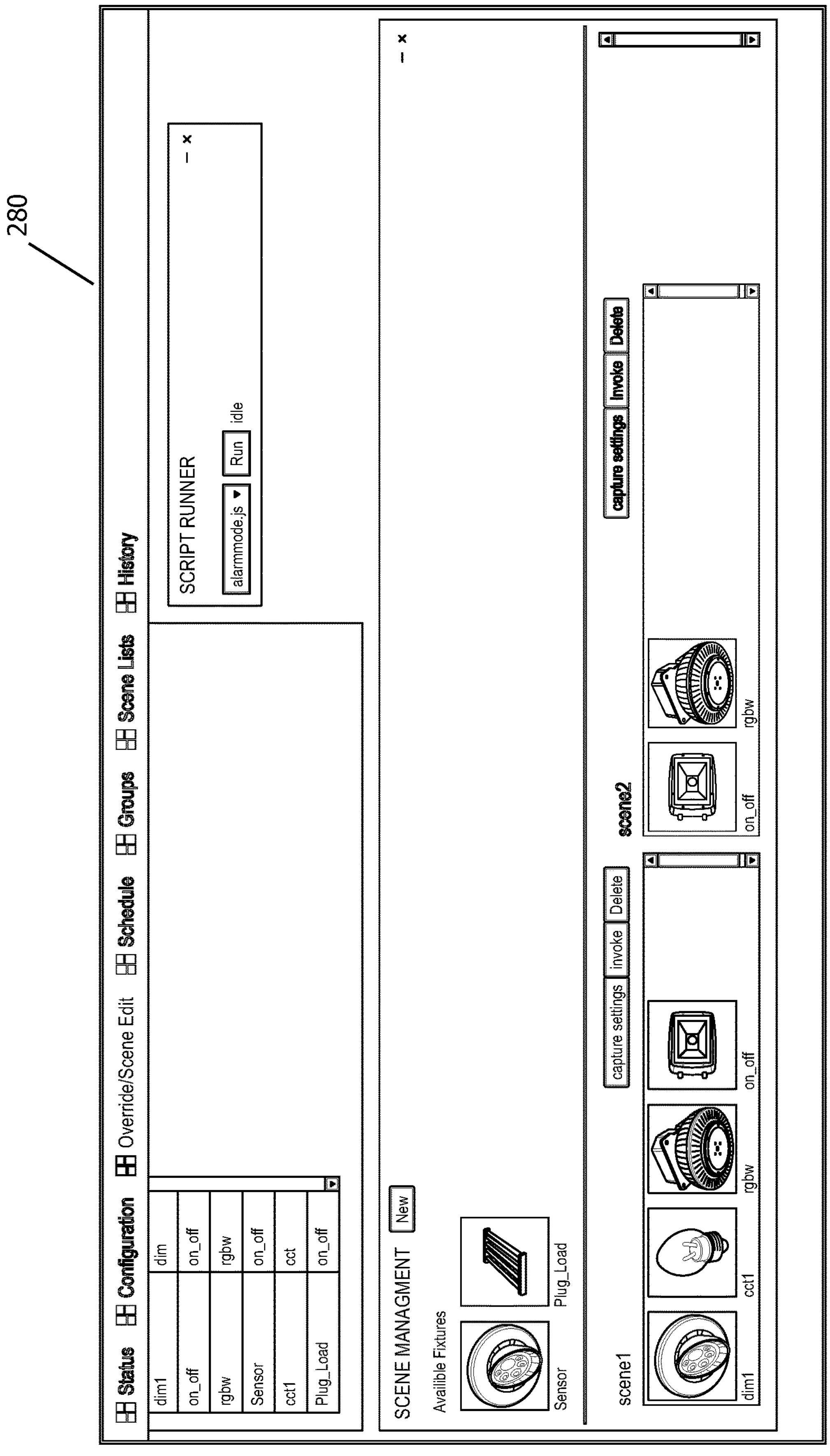
FIG. 5D is an example hosted web page for viewing and configuring scenes of lighting devices through the control system.

FIG. 5D shows a diagram of a web page for drag-and-drop creation of new scenes, comprising lighting devices and groups or lighting devices. The scenes include predefined settings for the lighting devices 106 allowing entire groups and/or individual lighting devices to be activated and set to the predefined settings defined within the scene. Predefined settings include, brightness, color hue, color temperature for each of the groups and/or individual lighting devices defines as part of the scene.

Figure 5E:
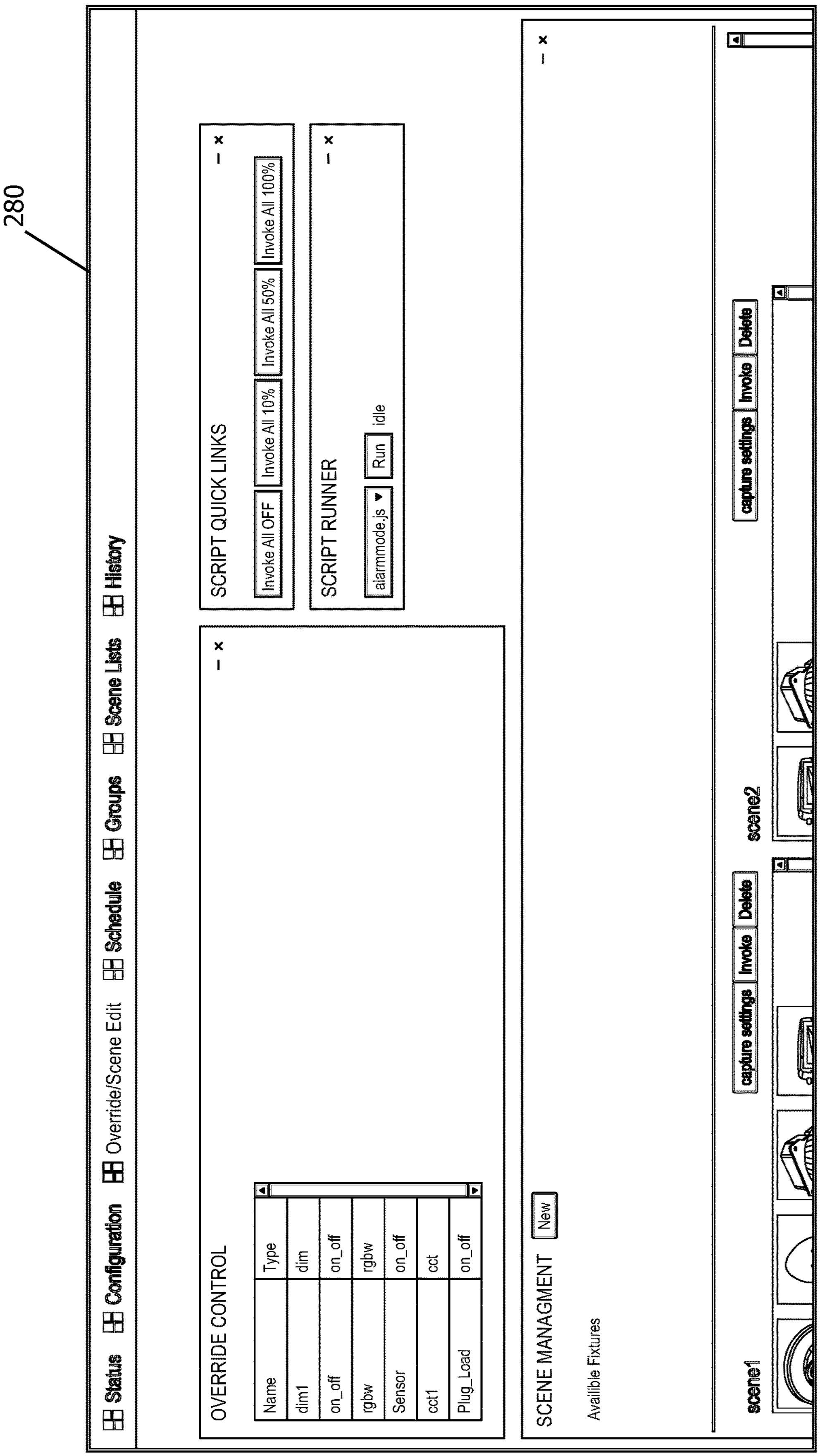
FIG. 5E is an example hosted web page for viewing and overriding presets of scenes of lighting devices through the control system.

FIG. 5E shows a diagram of a web page for overriding scene presets, including toggling all the lighting devices within the scene on/off, or setting to a brightness, such as 10%, 50% or 100%.

Figure 5F:
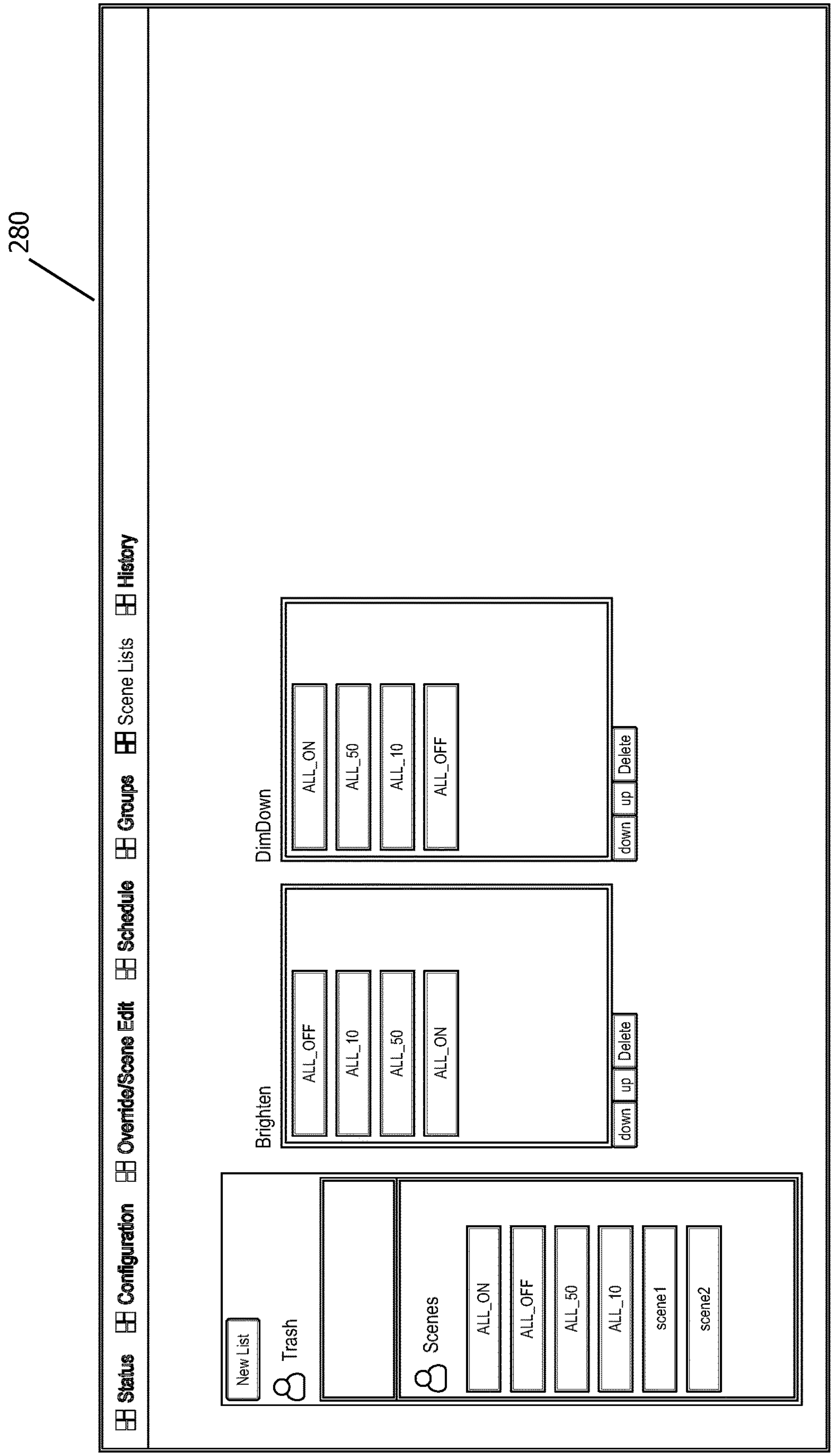
FIG. 5F is an example hosted web page for viewing and creating scene scripts for lighting devices of the system.

FIG. 5F shows a diagram of a web page for creating scene scripts, allowing multiple commands to be executed for the lighting devices 106 connected to the control system 102, individually or by groups and over time intervals or preset times.

Figure 5G:
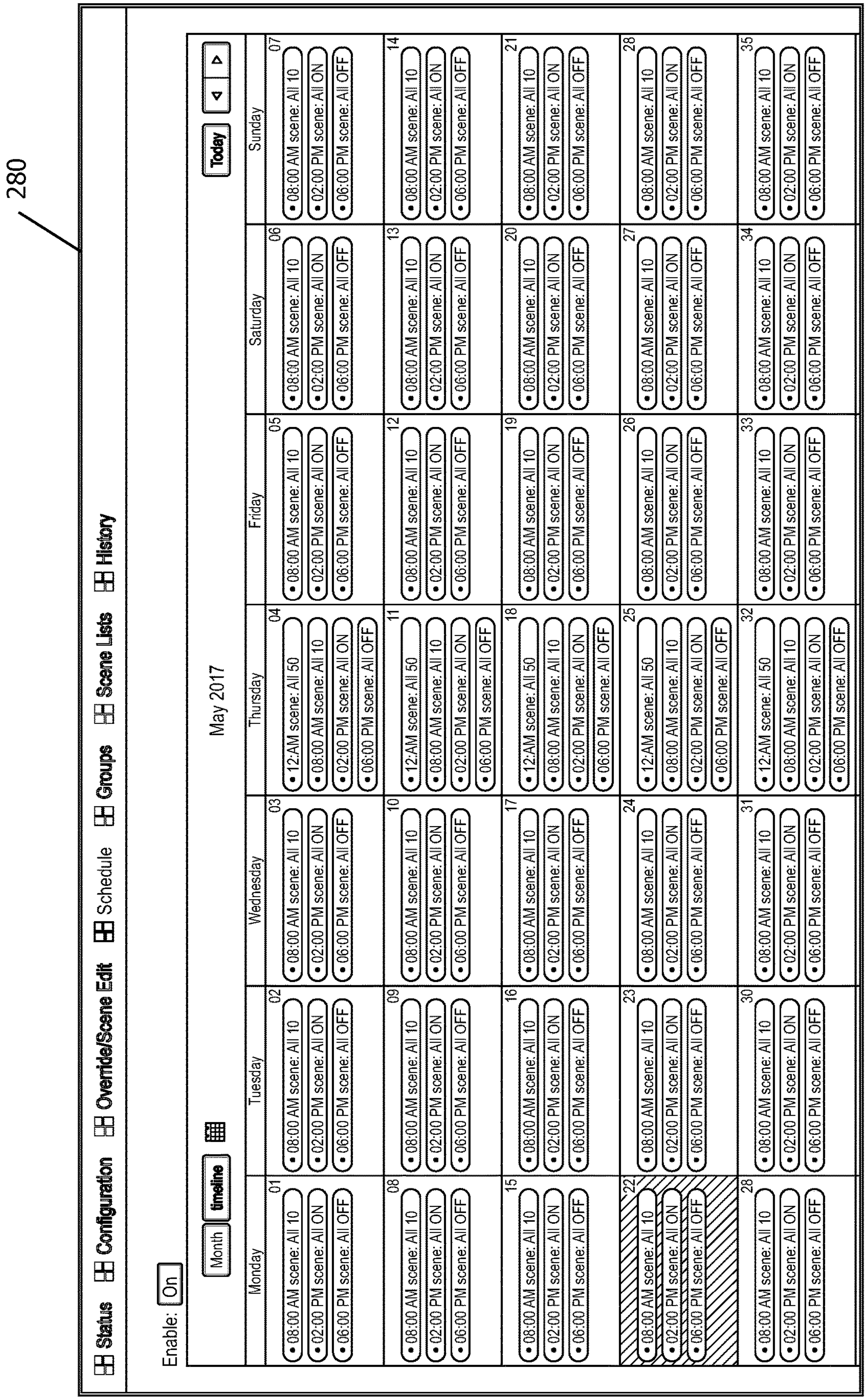
FIG. 5G is an example hosted web page for viewing scheduled operations of lighting devices through the control system. Note multiple schedules can be employed with one or more active at any time.
Figure 5H:
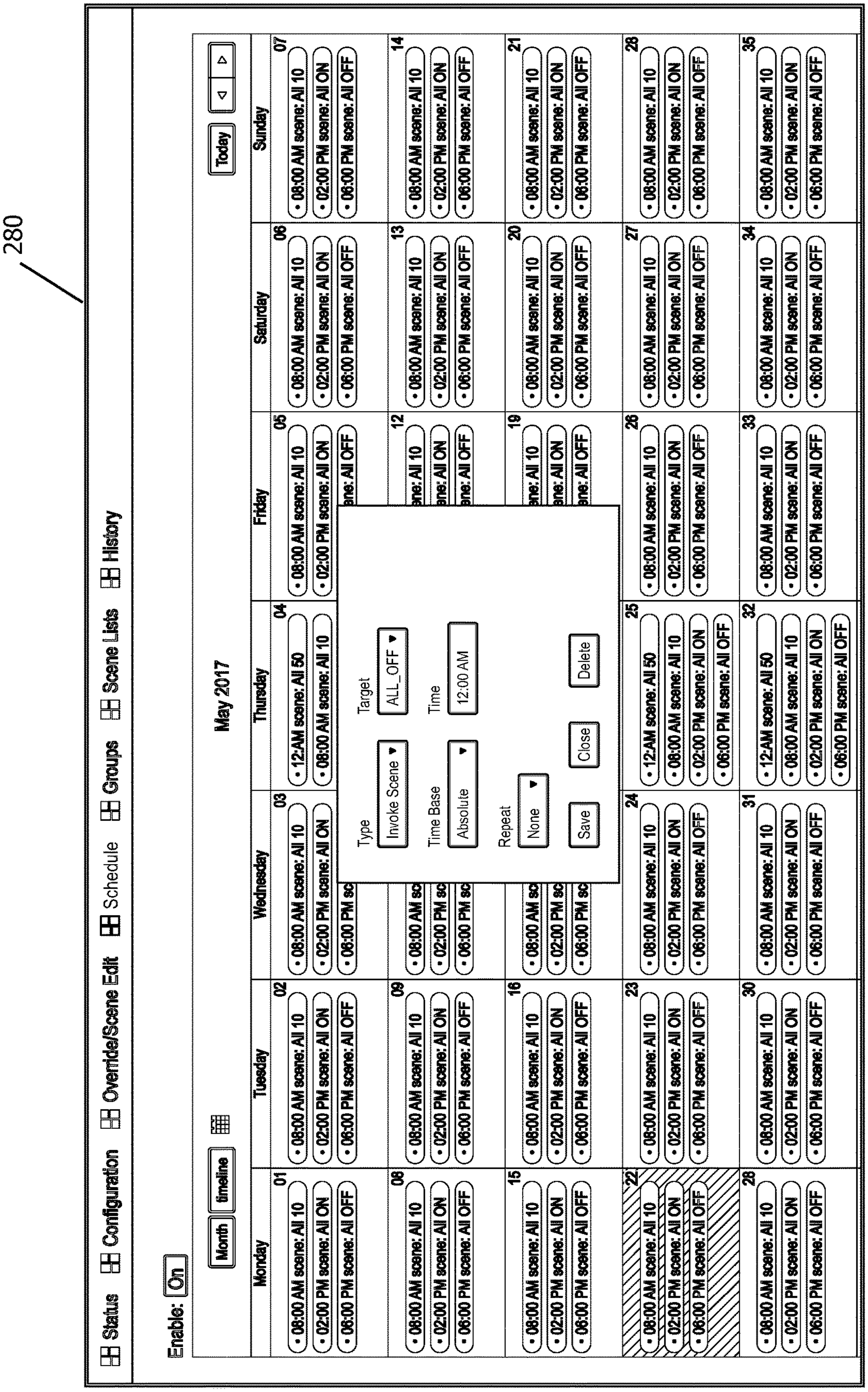
FIG. 5H is an example hosted web page for scheduling operation of lighting devices through the control system.

FIGS. 5G and 5H shows diagrams of web pages for scheduling operation of devices connected to the control system 102, allowing lighting devices 106 to be operated by day, time and/or duration at recurring intervals as desired by the user. Lighting devices 106 may be scheduled individually, by group or by scene.

Figure 5I:
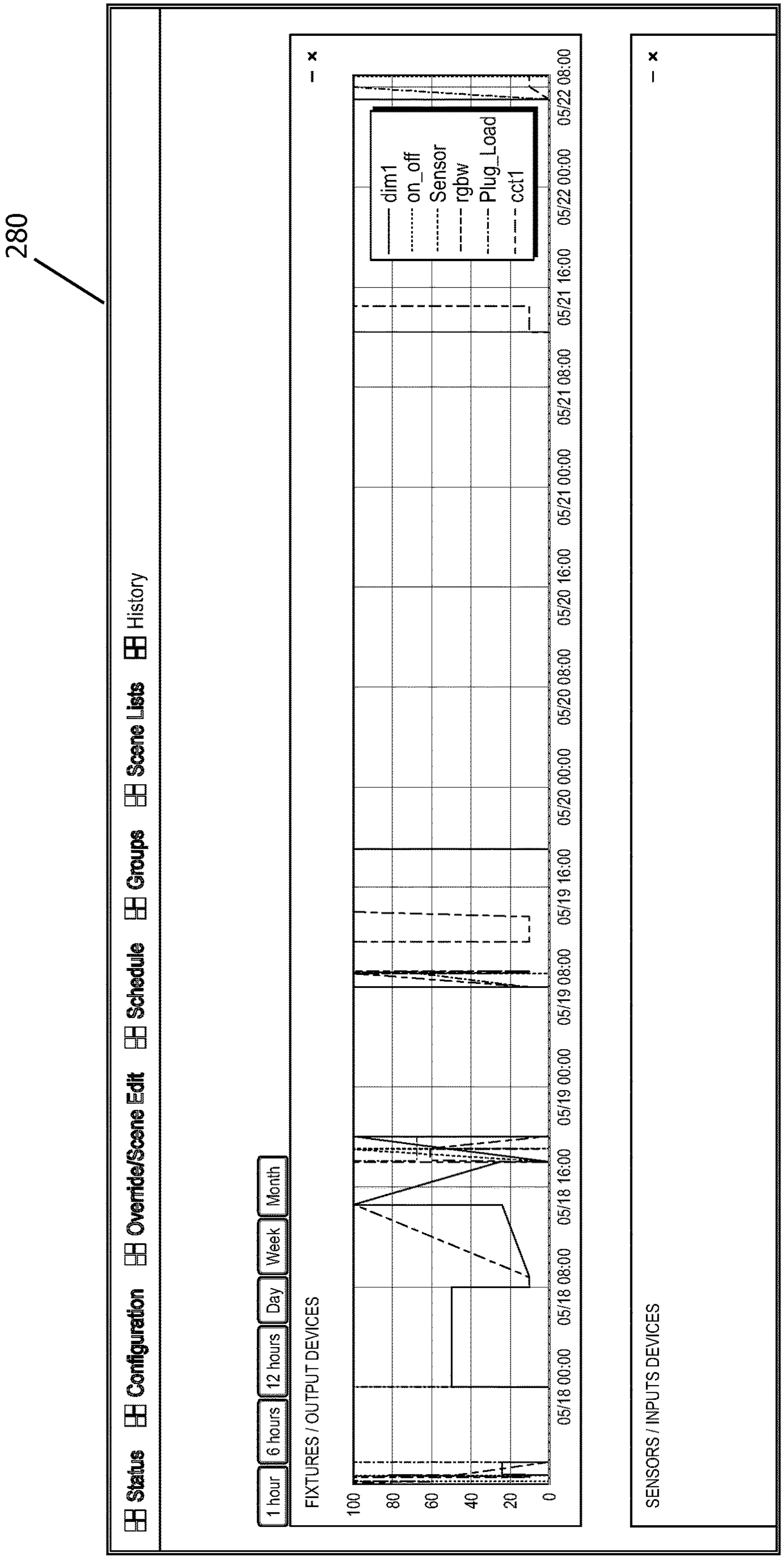
FIG. 5I is an example hosted web page for viewing usage history of lighting devices of the system.

FIG. 5I shows a diagram of a web page showing usage history of the system 100 by device, over a user selected time period, such as an hour, six hours, twelve hours, a day, a week or a month, for instance.

FIG. 5J shows a Logic Binder that allows the user to create conditions by which stimuli can be concurrently evaluated and one or more responses can be triggered if the conditions are satisfied. This has particular value in physical spaces that change based on wall partitions (for example) where a wall switch or sensor can dynamically sense the state of walls being open/closed and dynamically define which fixtures and which groups respond to a button press or sensor state. Similar virtue can be extracted in a warehouse where a collection of N sensors must ALL be vacant before turning lights off, but ANY sensor can turn a group of lights on. External Parking Lots hold similar paradigms and functional requirements.

FIGS. 6A-6E illustrate webpages that may be served by an exemplary control station 280 or control system 102. The control station 280 may include instructions stored in the storage component 204, that when executed, cause the processor 220 to display a web page through on a display, such as output component 260, of the control station 280. The webpage may be stored locally in a storage component 240 of the control station 280, or retrieved from the control system 102 via a communication through communication interface 260. As an example, Linux operating system software may be adapted for use on the control station 280. Further, the control station may have software, such as web browser, or the like, to receive, render and display communications received and/or transmitted through communication interface 270. The control stations webpages include a title bar having setting information grouped by scenes, groups, fixture control, status, and configuration information, which will be described further below.

Figure 6A:
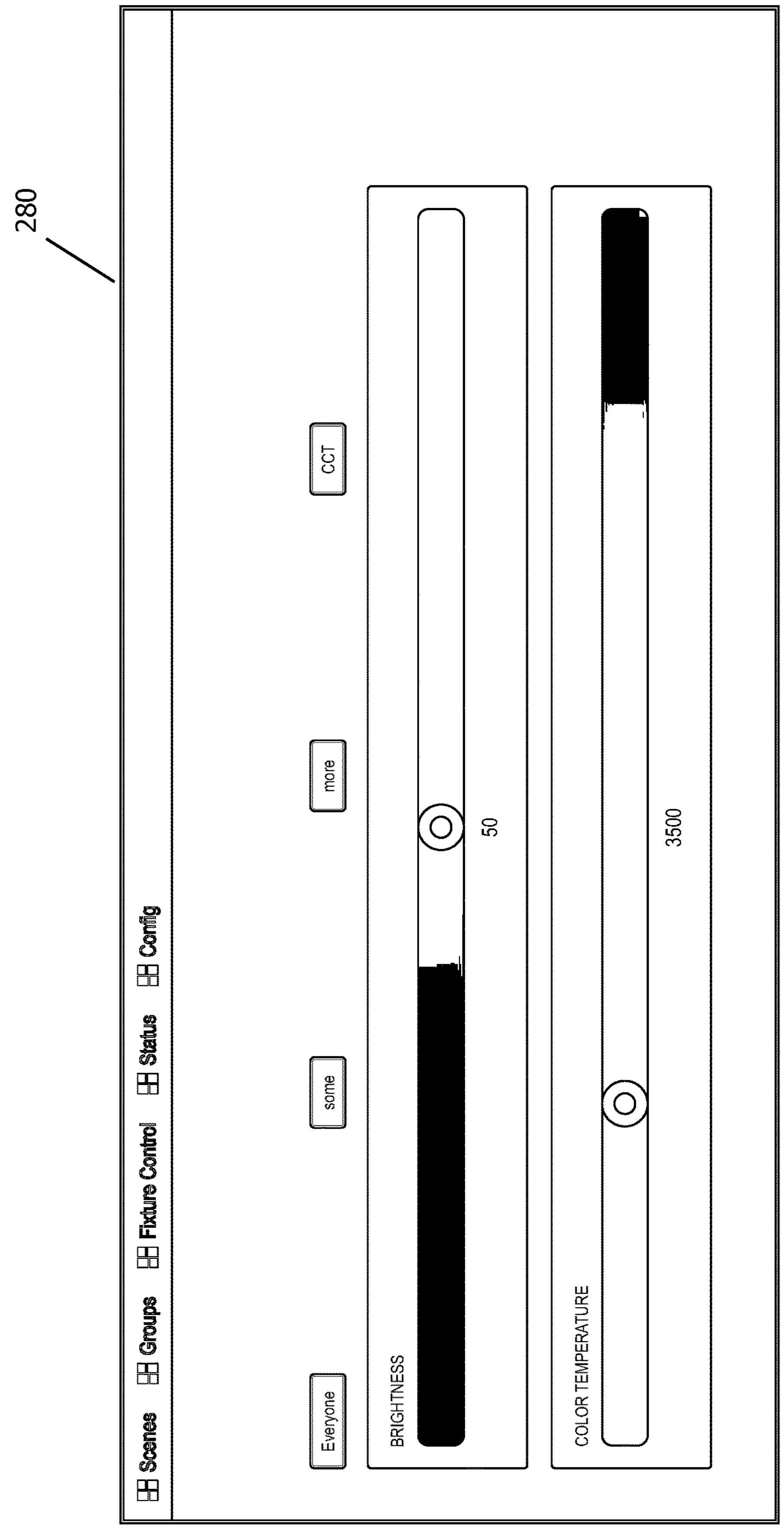
FIG. 6A is an example web page of a control station or control system for controlling groups of lighting devices.

FIG. 6A shows a diagram of a web page of a control station 280 or control system 102 group controls page, allowing the brightness and color temperature of devices in a particular group to be dimmed, switched on/off, and the color temperature to be manually controlled.

Figure 6B:
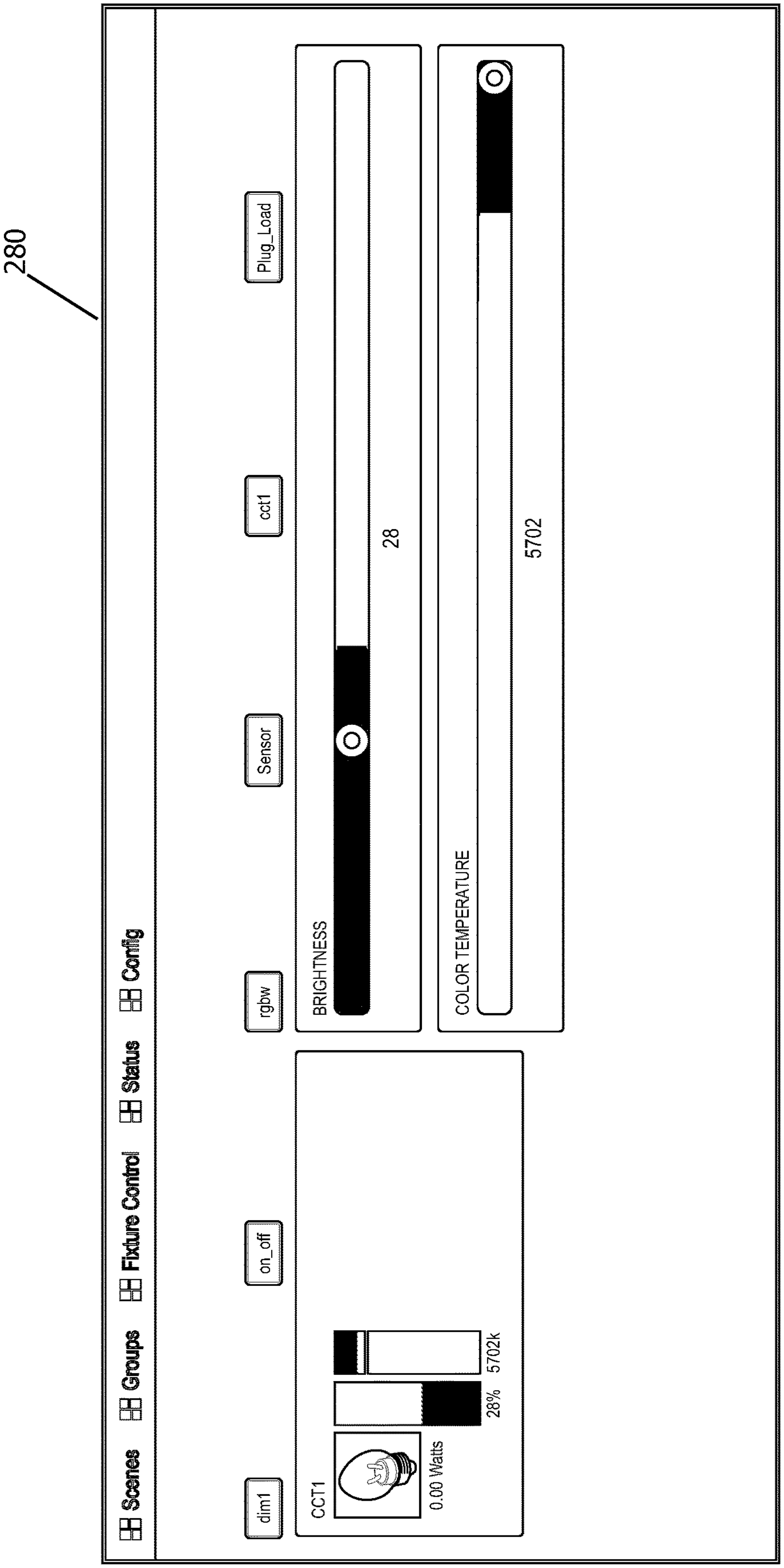
FIG. 6B is an example web page of a control station or control system for controlling color temperature and brightness of individual lighting devices.

FIG. 6B shows a diagram of a web page of a control station 280 or control system 102 individual lighting device 106 control, allowing the brightness and color temperature of individual lighting devices 106 to be manually controlled. The light 106, 108 may also be toggle on/off, adjust its color hue (described further below), and returned to sensor and/or pre-set settings.

Figure 6C:
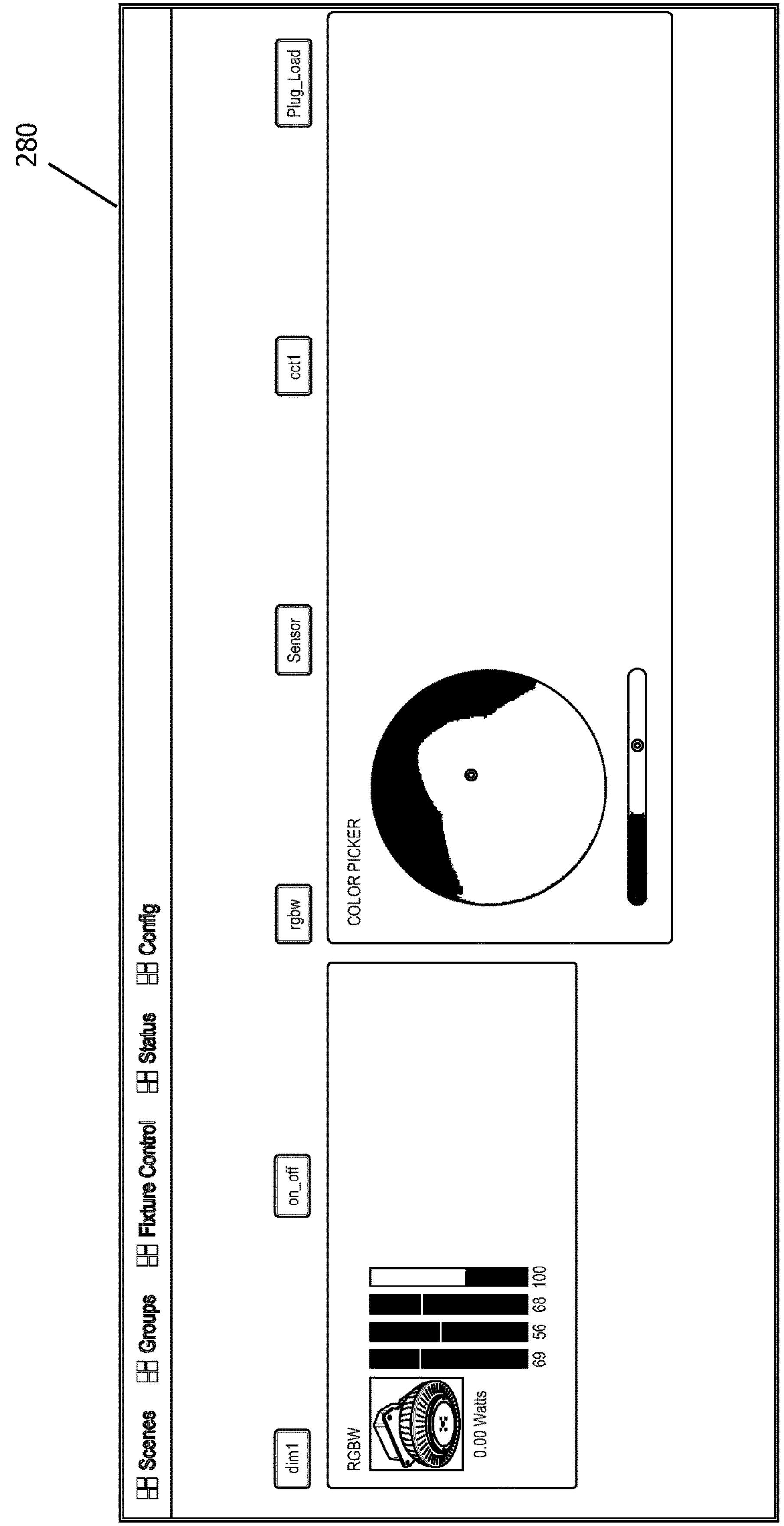
FIG. 6C is an example web page of a control station or control system for controlling color hue of individual lighting devices.

FIG. 6C shows a diagram of a web page of a control station 280 or control system 102 individual lighting device 106 control, allowing the color hue of individual lighting devices 106 that supports color, to be manually controlled. The user may select a color from a color picker wheel, or adjust individual sliders of red, green, blue and white to select the desired color hue. The software can have multiple channel settings so controls interfaces for RGBAWC (red green blue amber warm cool) can be created. Different intensities and configuration options implemented in hardware are abstracted away via the software user interface.

Figure 6D:
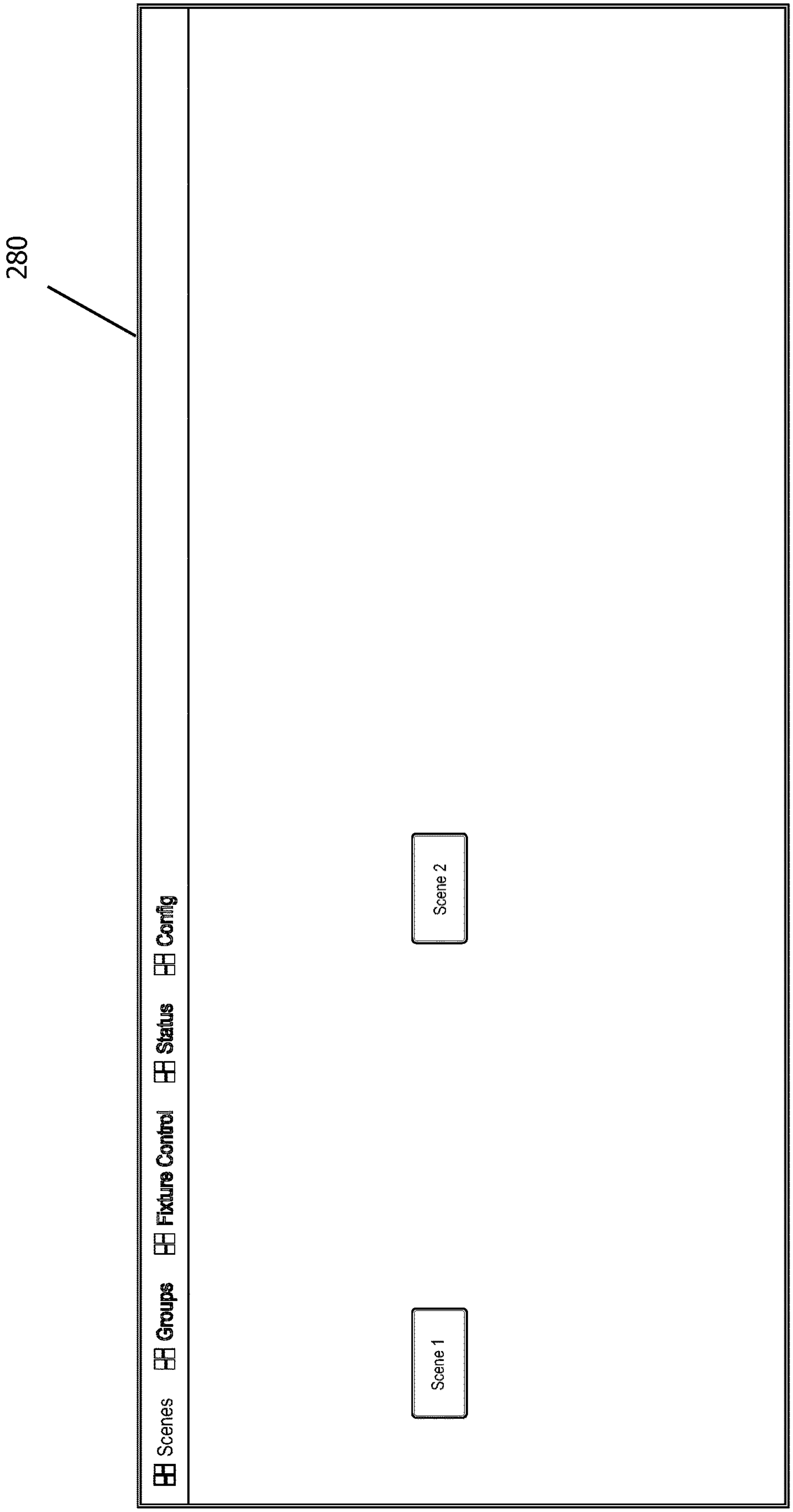
FIG. 6D is an example web page of a control station or control system scene selection screen.

FIG. 6D shows a diagram of a web page of a control system 102 or control station 280 scene selection screen, allowing user to activate the lighting settings for a scene for the system 100 or light elements specifically assigned or controlled to the control station 102. The scene selection screen allows a user to apply all preset scene information to all lighting devices simultaneously that have setting information predefined within the scene settings.

Figure 6E:
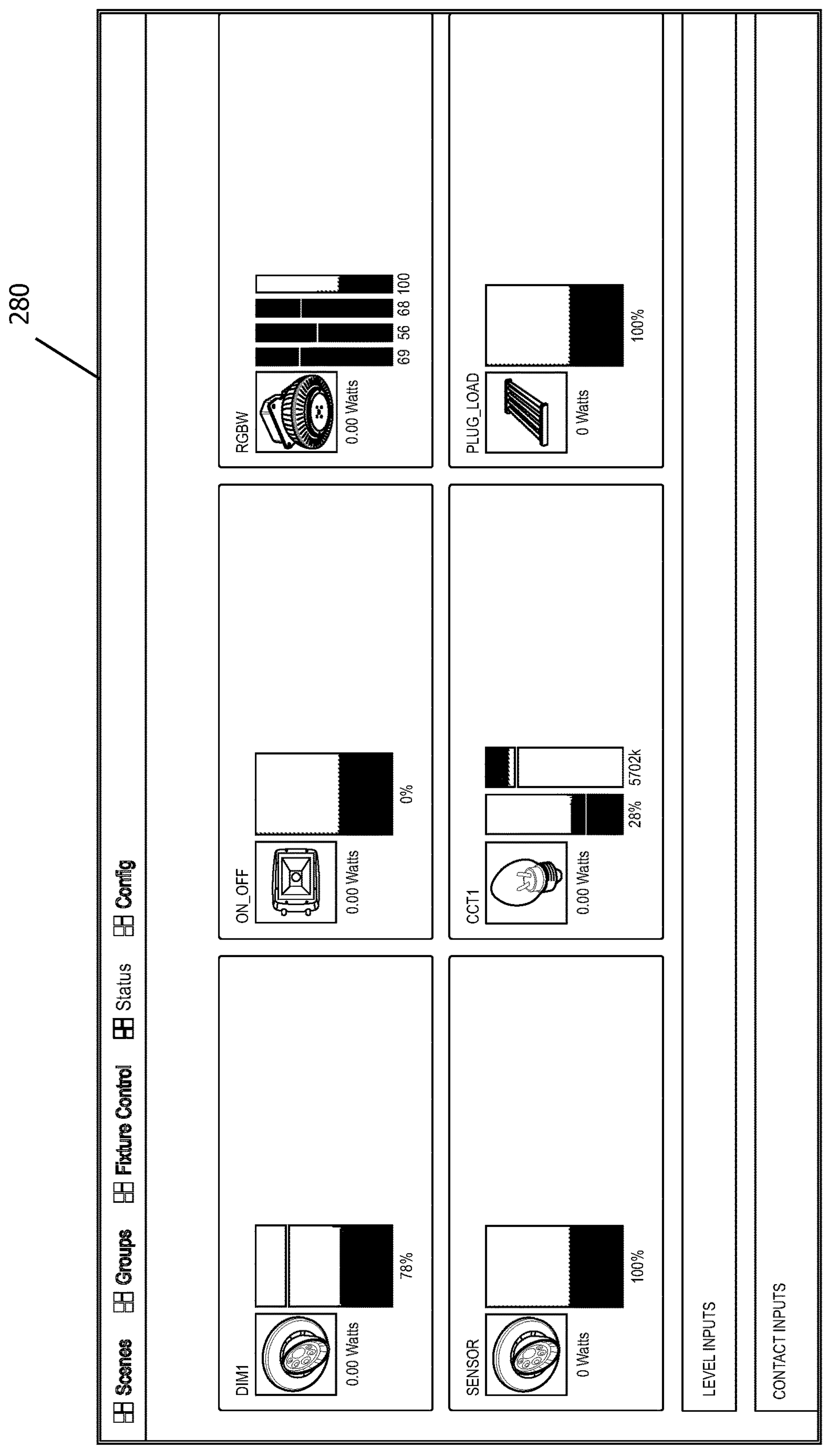
FIG. 6E is an example web page of a control station or control system status screen, showing all lighting devices connected to the system.

FIG. 6E shows a diagram of a web page of a control system 102 or control station 280 status screen, showing all lighting elements connected to the control system 102 or controllable by the control station 280. The status information includes the type of device, an optional picture of the device, whether the device is on/off, and the current settings of the device, such as color hue, brightness, and/or color temperature.

FIG. 6F shows a method of dynamically creating a state machine in software that constantly looks at specific events (such as a sensor state transitioning) in a specific order before creation of a response. The method includes a manner to create user defined variables, a manner to test event state against those variables, a manner in which the state of those variables can be tested against in the effort to create any logical condition for affecting the state of the lights. An example is hotel partition space where doors dynamically create rooms and wall switches and occupancy sensors have to know which group of fixtures they are affecting based on the state of the partitions. If all sensors are vacant, wait until any one of them become occupied, then look for a wall switch event to decide which group of lights to turn on. When someone walks into a space for the first time—bring up all the lights turning the space occupied. Create dynamic state variables for given spaces based on collections of inputs (ex. partition sensors) and dynamically create vacant and occupied status based on the state of a given space."

Figure 7:
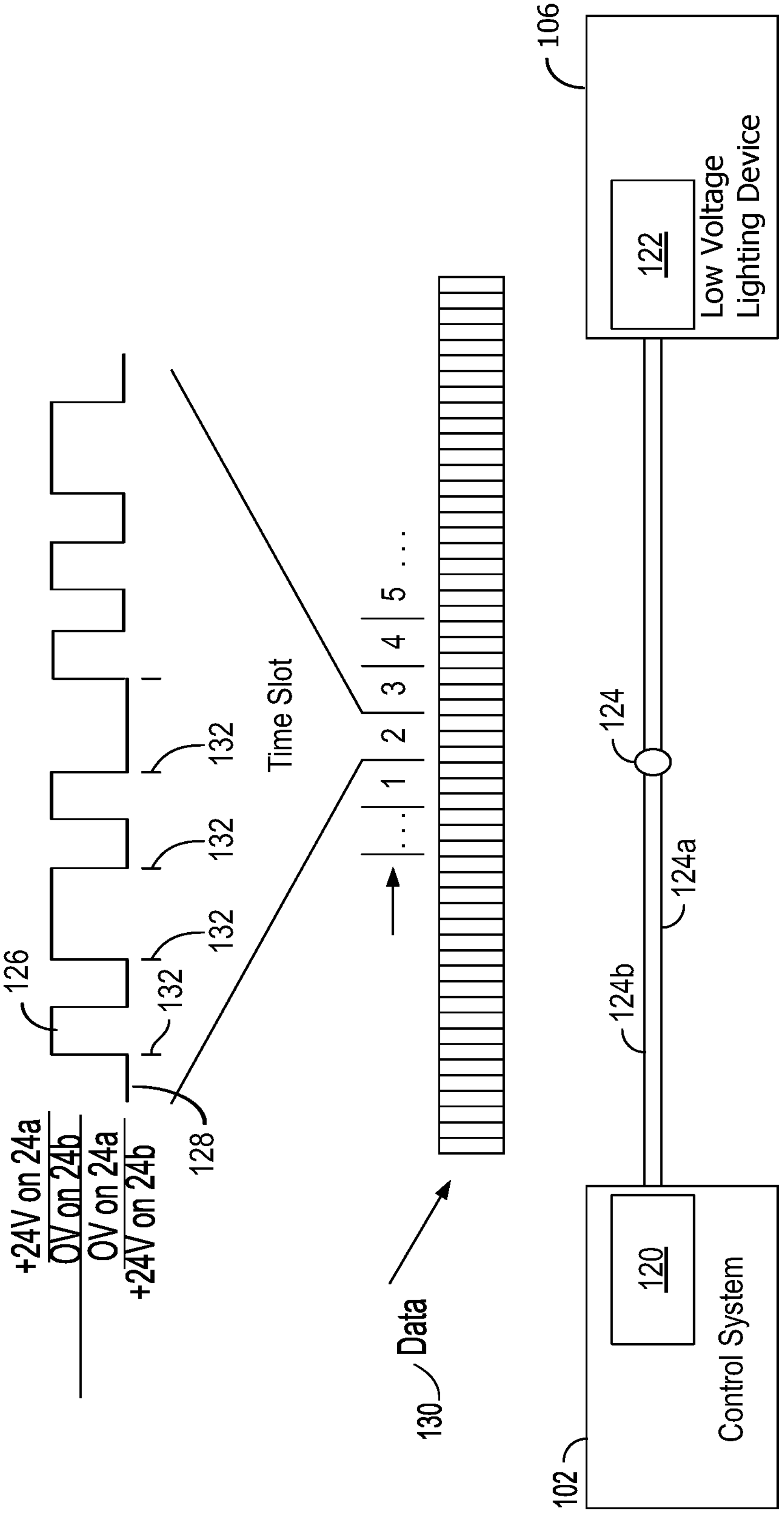
FIG. 7 is a diagram of the operation of the lighting control interface.

Turning now to FIG. 7, a diagram illustrating the operational principal of the lighting control system and devices is described. The control system 102 contains a transmitter 120 while the controlled devices 106 include a receiver 122 therein. In this manner, the transmitter 120 and receiver 122 serve to interface each of the controlled devices 106 and the control system 102 along the two wire power delivery wires 124 that extend between the control system 102 and the controlled devices 106. In accordance with the disclosure the power delivery wires carry the low voltage DC power to the controlled devices as is known in the art. The power and communication delivery is polarity agnostic. This is done by providing power onto the two power lines 124*a* and 124*b* using a bridge rectifier. The system is driven by applying +24V to 124*a* relative to 124*b* to create a mark 126 (a binary 1) and by applying +24V to 124*b* relative to 124*a* to create a space 128 (a binary 0). In this manner it can always be noted that a +24V is being delivered between the controller and the controlled devices.

During normal operation the transmitter 120 remains in the serial idle (mark, 126) state. The receiver, 122, uses this idle period to detect the polarity of 124*a* and 124*b* and invert if necessary due to a line swap, while a bridge rectifier within 122 allows +24V to pass through to the driven device 106. At the start of a serial byte, the transmitter sends a start bit (space), followed by eight data bits and a stop bit (mark). The process is repeated for the duration of the packet, then the bus 124 is returned to the idle state. It can be appreciated that while operation has been described using one polarity arrangement, reversing this arrangement is also considered to fall within the scope of the disclosure. Further, while a DC voltage of +24V has been disclosed, any scheme using any range of DC voltage would also fall within the scope of the disclosure.

When sending a message to the receiver, the coding scheme employed may be generally known as a bi-phase code or Manchester encoding where the logic is interpreted by identifying the voltage condition at the center of each bit and the transition from mark to space or space to mark happens at the bit boundary 132 so that the 90 degree phase transition during the bit is interpreted as a mark. Such encoding is well known in the art so the specifics of such encoding will not be further disclosed herein. Other methods can be used similar to this construct to affect communication in one direction Each of the driven devices 106 is addressable meaning that they each have a unique binary code or name associated therewith. As a result, the preamble of the data communication can communicate a broadcast address as well as the specific device address to tell which driven devices 106 are required to respond the control signal that then follows. This allows a plurality of devices to he controlled in a fully integrated manner using existing 2 wire power supplies that are already installed while providing a flicker free control environment. Such a communication protocol is agnostic to both wire length and gauge making reuse of existing wiring rather than replacement possible.

Back channel communication as from the receiver to the transmitter is achieved my modulating the device 106 load on the communication bus. This allows the transmitter to receive a response communication from the controlled device to acknowledge connection and operational status of the device. The return communication (back channel) can be implemented in a variety or multitude of manners including amplitude modulation (adding extra load in a pre-existing pattern), frequency modulated (emitting a response in the frequency domain requiring some sort of FFT (fast Fourier Transform or equivalent) to encode/decode the message, phase modulation, frequency shift keying, tone separation, dynamic carrier frequency modulation etc. The system also incorporates a dynamic means of assessing the best means of communication in advance to maximize signal to noise ratio. For example, the initiator can perform a dynamic frequency spectrum response table and then assign targets a specific frequency band in which to communicate. Other manners and methods can be employed in this embodiment to always secure the highest Signal/Noise Ratio to maximize throughput and minimize latency of any communication. During normal operation the transmitter 120 remains in the serial idle (mark, 126) state. The receiver, 122, uses this idle period to detect the polarity of 124*a* and 124*b* and invert if necessary due to a line swap, while a bridge rectifier within 122 allows +24V to pass through to the driven device 106. At the start of a serial byte, the transmitter sends a start bit (space), followed by eight data bits and a stop bit (mark). The process is repeated for the duration of the packet, then the bus 124 is returned to the idle state. It can be appreciated that while operation has been described using one polarity arrangement, reversing this arrangement is also considered to fall within the scope of the disclosure. Further, while a DC voltage of +24V has been disclosed, any scheme using any range of DC voltage would also fall within the scope of the disclosure.

Therefore, it can be seen that the lighting control system and devices described herein provide a unique solution to the problem of providing control system that includes multiple configurable options to control a variety of lighting devices, sensors and plug load devices that is centralized, yet highly customizable and expandable. The control system provides an efficient method to operate lighting devices systematically that conserves power and provides for a desirable lighting solution to commercial and residential buildings.

It would be appreciated by those skilled in the art that various changes and modifications can be made to the illustrated embodiments without departing from the spirit of the present invention. All such modifications and changes are intended to be within the scope of the present invention except as limited by the scope of the appended claims

What is claimed is:

1. A lighting control system, comprising:

a control system having a transmitter therein;

a plurality of lighting devices connected to the controller, each of said plurality of lighting devices having a receiver therein;

the transmitter delivering a supply voltage to each of said receivers, wherein said transmitter is configured to selectively modulate said supply voltage to each respective receiver to thereby selectively generate a respective data control signal to each respective receiver, said respective control signal being received and used by each of said respective receivers to selectively operate the plurality of lighting devices.

2. The lighting control system of claim 1, wherein the control system receives operational instructions from a communication interface.

3. The lighting control system of claim 2, wherein the communication interface is a wireless transmitter/receiver.

4. The lighting control system of claim 3, wherein the wireless transmitter/receiver is selected from the group consisting of Bluetooth, EnOcean, IEEE 802.11, and IEEE 802.15.4 standard devices.

5. The lighting control system of claim 2, wherein the communication interface comprises a wired transmitter/receiver.

6. The lighting control system of claim 5, wherein the wired transmitter/receiver comprises an ethernet device.

7. The lighting control system of claim 2, further comprising a control station connected to the communication interface, the control station configured to generate control inputs and transmit them through the communication interface.

8. The lighting control system of claim 2, further comprising a plurality of additional control systems connected to the communication interface.

9. The lighting control system of claim 1 further comprising:

a first wire and a second wire extending from said transmitter to each of said receivers, wherein said supply voltage is a DC voltage transmitted along said first wire.

10. The lighting control system of claim 9, wherein said control system modulates said supply voltage so that said DC voltage is transmitted along said second wire causing said receiver to read said modulation as a mark and a return to said first wire as a space, a plurality of modulated marks and spaces comprising a message to said plurality of receivers comprising instructions regarding operation of said plurality of lighting devices.

11. The lighting control system of claim 10, wherein said receiver includes a rectifier that corrects said modulated supply voltage wherein said lighting device receives supply voltage at a correct polarity.

12. The lighting control system of claim 10, wherein the instructions comprise: instructions that, when executed, cause the receiver to selectively operate lighting devices according to user-settable settings received.

13. The lighting control system of claim 10, wherein the instructions comprise: instructions that, when executed, cause the receiver to selectively group lighting devices logically together to be operatively controlled as a unit according to user-settable settings received.

14. The lighting control system of claim 10, wherein the instructions comprise: instructions that, when executed, cause the receiver to selectively schedule lighting devices to operate at desired days, times, or durations according to user-settable settings received.

* * * * *